United States Patent
Huang et al.

(10) Patent No.: US 8,438,405 B2
(45) Date of Patent: May 7, 2013

(54) COMPUTER POWER SUPPLY FOR CONVERTING A POWER STATE TO A HIGH FREQUENCY SIGNAL AND CARRYING THE HIGH-FREQUENCY SIGNAL IN A DC VOLTAGE LEVEL OF A POWER GOOD PIN

(75) Inventors: Kuo-Chen Huang, Taipei (TW); Yu-Cheng Shen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 457 days.

(21) Appl. No.: 12/719,009

(22) Filed: Mar. 8, 2010

(65) Prior Publication Data

US 2010/0250977 A1 Sep. 30, 2010

(30) Foreign Application Priority Data

Mar. 27, 2009 (TW) ................................ 98110213 A

(51) Int. Cl.
*G06F 1/00* (2006.01)
*G06F 1/32* (2006.01)

(52) U.S. Cl.
USPC .......................................... 713/300; 713/320

(58) Field of Classification Search .................. 713/300, 713/320
See application file for complete search history.

(56) References Cited

U.S. PATENT DOCUMENTS

| 7,081,719 | B2 | 7/2006 | Chang et al. | |
| 2003/0025396 | A1* | 2/2003 | Shen et al. | 307/64 |
| 2003/0053321 | A1* | 3/2003 | Ishiyama | 363/59 |
| 2003/0067224 | A1* | 4/2003 | Tai | 307/117 |
| 2005/0207189 | A1* | 9/2005 | Chen | 363/21.15 |
| 2006/0026420 | A1* | 2/2006 | Babb et al. | 713/150 |
| 2006/0217905 | A1* | 9/2006 | Pai et al. | 702/60 |
| 2007/0139018 | A1* | 6/2007 | Mentelos | 320/166 |
| 2008/0074818 | A1* | 3/2008 | Lee et al. | 361/91.3 |

FOREIGN PATENT DOCUMENTS

| CN | 1945495 | 4/2007 |
| TW | 587786 | 5/2004 |

* cited by examiner

*Primary Examiner* — Thomas Lee
*Assistant Examiner* — Phil Nguyen
(74) *Attorney, Agent, or Firm* — Jianq Chyun IP Office

(57) ABSTRACT

The invention discloses a compute system which may detect the state of a power supply. The system includes a power supply and a motherboard. The power supply has a detecting unit for detecting a power state of the power supply. The detected information is converted to a high-frequency signal and outputted to the motherboard via a "power good" pin in an ATX power connector. The motherboard may obtain a voltage, current, power, temperature and other values inside the power supply via the ATX power connector and allow the values to be displayed on the screen to provide a real-time monitoring function for the users.

10 Claims, 5 Drawing Sheets

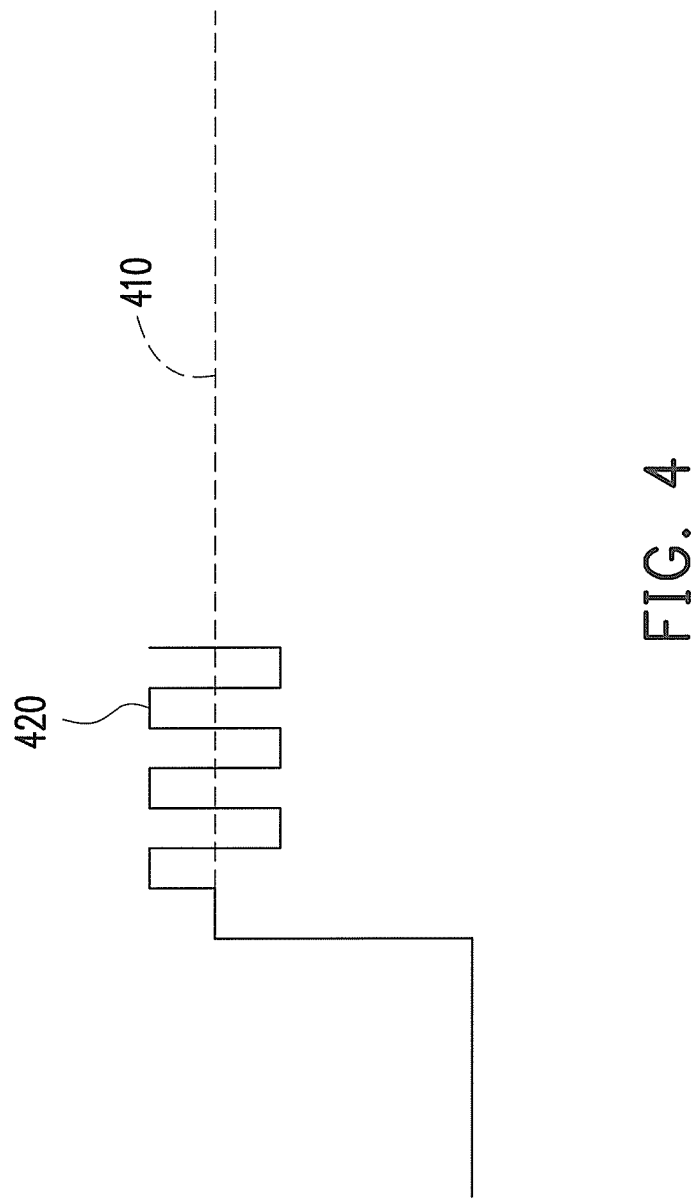

COMPUTER POWER SUPPLY FOR CONVERTING A POWER STATE TO A HIGH FREQUENCY SIGNAL AND CARRYING THE HIGH-FREQUENCY SIGNAL IN A DC VOLTAGE LEVEL OF A POWER GOOD PIN

CROSS-REFERENCE TO RELATED APPLICATION

This application claims the priority benefit of Taiwan application serial no. 98110213, filed on Mar. 27, 2009. The entirety of the above-mentioned patent application is hereby incorporated by reference herein and made a part of specification.

BACKGROUND OF THE INVENTION

1. Field of the Invention

The invention relates to a computer system and, more particularly, to a computer system in which information of a power supply is outputted to a computer screen via an advanced technology extended (ATX) power connector to provide a real-time monitoring function for users.

2. Description of the Related Art

Advanced technology extended (ATX) is a spec of the motherboard designed by Intel in 1995. The ATX overtook advanced technology (AT) as the default spec of the motherboard for current computer systems, and it is also the most universal spec of the motherboard in an assembled computer. In addition, multiple spec of the motherboards such as micro ATX, Flex ATX and mini-ATX are developed from the ATX, but most of them have the same the basic specification.

In the previous ATX form factor, the power connector is a 20-pin connector. However, with the increase of the power consumption of a microprocessor, the standard 20-pin ATX power connector is deemed inadequate to supply increasing electrical load requirements. Thus, in the new ATX form factor, a 4-pin power connector is extra added. Thus, the currently used ATX power connector has 24 pins. Since the currently used power supply of the personal computer is restricted by the Intel specification, it is hard to add pins for transmitting information related to the state of the power supply to the original 24-pin connector. Neither the normal 20-pin ATX power connector nor the 24-pin ATX power connector has pins for transmitting the information. Thus, the computer system cannot obtain the voltage, the current, the temperature and other information of the ATX power supply via the ATX power connector.

In the conventional method, a system and a power supply with a power monitoring function are provided. A transmission cable such as a universal serial bus (USB) cable is used to transmit the information related to the state of the power supply to the motherboard. This method allows the power supply to be monitored via software instructions. However, since connectors for transmitting information should be additionally disposed in the power supply, the manufacturing cost of the power supply increases, and thus the assembly difficulty increases therewith.

BRIEF SUMMARY OF THE INVENTION

The invention discloses a computer system in which an inner power state of an ATX power supply is outputted via a standard ATX power connector, therefore allowing the computer system to know voltages, currents, temperature changes and other information of a primary winding circuit and a secondary winding circuit of the ATX power supply. The related information is displayed on the screen to provide a real-time monitoring function for the users.

The invention discloses a computer system including a power supply and a motherboard. The power supply has a state detecting unit and an ATX power connector. The power supply has a state detecting unit for detecting a voltage, a current and a power state of the power supply, and then the power state is converted to a high-frequency signal. The ATX power connector has a "power good" pin, and the power supply transmits the high-frequency signal to a motherboard via the "power good" pin. The motherboard has a decoder and an ATX power plug to be connected to the ATX power connector of the power supply to receive the voltage and the high-frequency signal outputted by the power supply. The decoder is used to decode the high-frequency signal of the "power good" pin and allow the state of the power supply to be displayed via the screen.

In the invention, the power state pin of the ATX power connector is the "power good" pin in compliance with the ATX power connector form factor. The power supply adjusts the DC voltage level of the "power good" pin to show whether the outputted DC voltage is in a normal voltage range. The state detecting unit carries the high-frequency signal in the DC voltage level of the power state pin.

In the invention, the amplitude of the high-frequency signal is less than half of the maximum value of the DC voltage level.

In the invention, the power supply further includes a voltage converter for converting an alternating current (AC) power to a direct current (DC) power. The voltage converter further includes an electromagnetic interference (EMI) filter, a power factor correction (PFC) circuit and a voltage converting circuit. The EMI filter is used to filter the high-frequency noise of the AC power. The PFC circuit is coupled to the output of the EMI filter, and the voltage converting circuit is coupled to the output of the PFC circuit to output the DC power. The state detecting unit is coupled to the voltage converter to detect the voltages, the currents, the powers, the temperatures and the fan speeds of the PFC circuit and the voltage converting circuit to generate the state information. The voltage converting circuit further includes a main transformer and a DC converter.

In the invention, the state detecting unit includes a first microcontroller and a second microcontroller. The first microcontroller is used to detect the state of the primary winding of the power supply. The second microcontroller is used to detect the state of the secondary winding of the power supply.

In the invention, the motherboard further includes a decoder coupled to the ATX power connector for decoding the high-frequency signal. The decoder may be a basic input/output system (BIOS).

In the invention, the power state information includes input voltage, input current, output voltage, output current, temperature value and protecting signal of the power supply.

Based on the above, in the invention, the power state pin ("power good" pin) in the ATX power connector is used to transmit the state information of the power supply. Thus, in a carrier wave mode, the high-frequency signal is carried on the DC voltage level of the "power good" pin to make the "power good" pin transmit two kinds of signals, namely the DC voltage change and the AC high-frequency signal. The motherboard may use the BIOS to decode the high-frequency signal and thus to know the state information of the power supply.

In the invention, since the original architecture of the ATX power connector is not changed, it may be adapted to the conventional ATX power supplying system and motherboard. Even if the motherboard cannot decode the high-frequency signal, the power supplying system in the invention also may be used normally.

These and other features, aspects and advantages of the present invention will become better understood with regard to the following description, appended claims, and accompanying drawings.

BRIEF DESCRIPTION OF THE DRAWINGS

FIG. 4 shows a waveform chart showing the signal wave in the "power good" pin.

DETAILED DESCRIPTION OF THE EMBODIMENTS

Figure 1A:
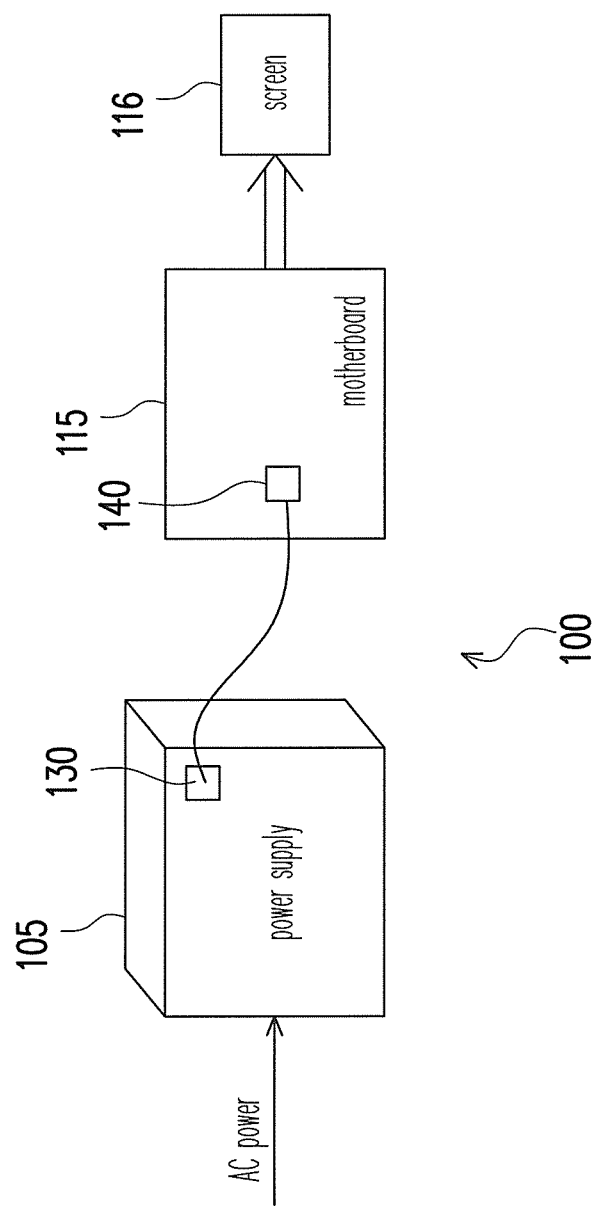
FIG. 1A is a schematic diagram showing the computer system in an embodiment of the invention.

FIG. 1A is a schematic diagram showing the computer system in an embodiment of the invention. As shown in FIG. 1, the computer system 100 includes a power supply 105 and a motherboard 115. The power supply 105 has an ATX power connector 130 for connecting an ATX power plug 140 on the motherboard 115. The power supply 105 converts the received AC power to a DC power, and then transmits the DC power (3.3V, 5V, 12V) to the motherboard 115 via the ATX power connector 130 to power the motherboard.

The power supply 105 has a state detecting unit 120 for detecting the inner power state of the power supply 105 such as input voltage, input current, output voltage, output current, temperature information or an protecting signal (which may be a overheating protecting signal) automatically, and then converting them to a high-frequency signal. The power supply 105 may make the "power good" pin of the ATX power connector 130 to carry the high-frequency signal and transmit the high-frequency signal to the motherboard 115 via the "power good" pin of the ATX power connector 130. The motherboard 115 has a decoder 150 which may decode the high-frequency signal. Thus, the state detecting unit 120 may monitor the power state of the power supply 105 instantly and display the power state on the screen 116 to allow the user to monitor the power state of the power supply 105.

Figure 1B:
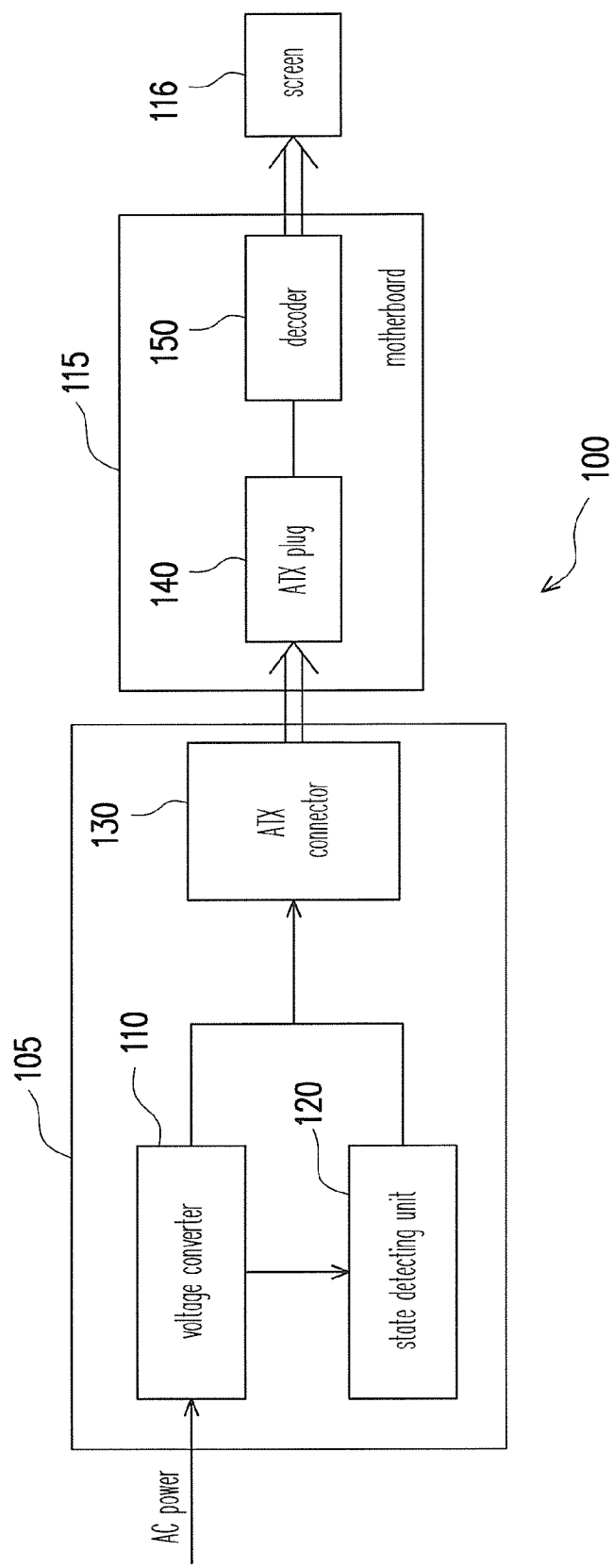
FIG. 1B is a block diagram showing the power supply of the computer system in an embodiment of the invention.

The inner circuit structures of the power supply 105 and the motherboard 115 are illustrated hereinbelow. FIG. 1B is a block diagram showing the power supply of the computer system in an embodiment of the invention. The computer system 100 includes a power supply 105 and a motherboard 115. The power supply 105 includes a voltage converter 110, a state detecting unit 120 and an ATX power connector 130. The motherboard 115 includes an ATX power plug 140 and a decoder 150. The voltage converter 110 and the state detecting unit 120 are coupled to the ATX power connector 130, and the state detecting unit 120 is further coupled to the voltage converter 110. The decoder 150 is coupled to the ATX power plug 140. The state detecting unit 120 disposed in the power supply 105 may detect the inner power state (including the input voltage, the input current, the output voltage, the output current, the power, the temperature and other information of the power supply) of the voltage converter 110 automatically, and then the inner power state of the voltage converter 110 is outputted to the motherboard 115 via the "power good" pin of the ATX power connector 130.

Figure 2:
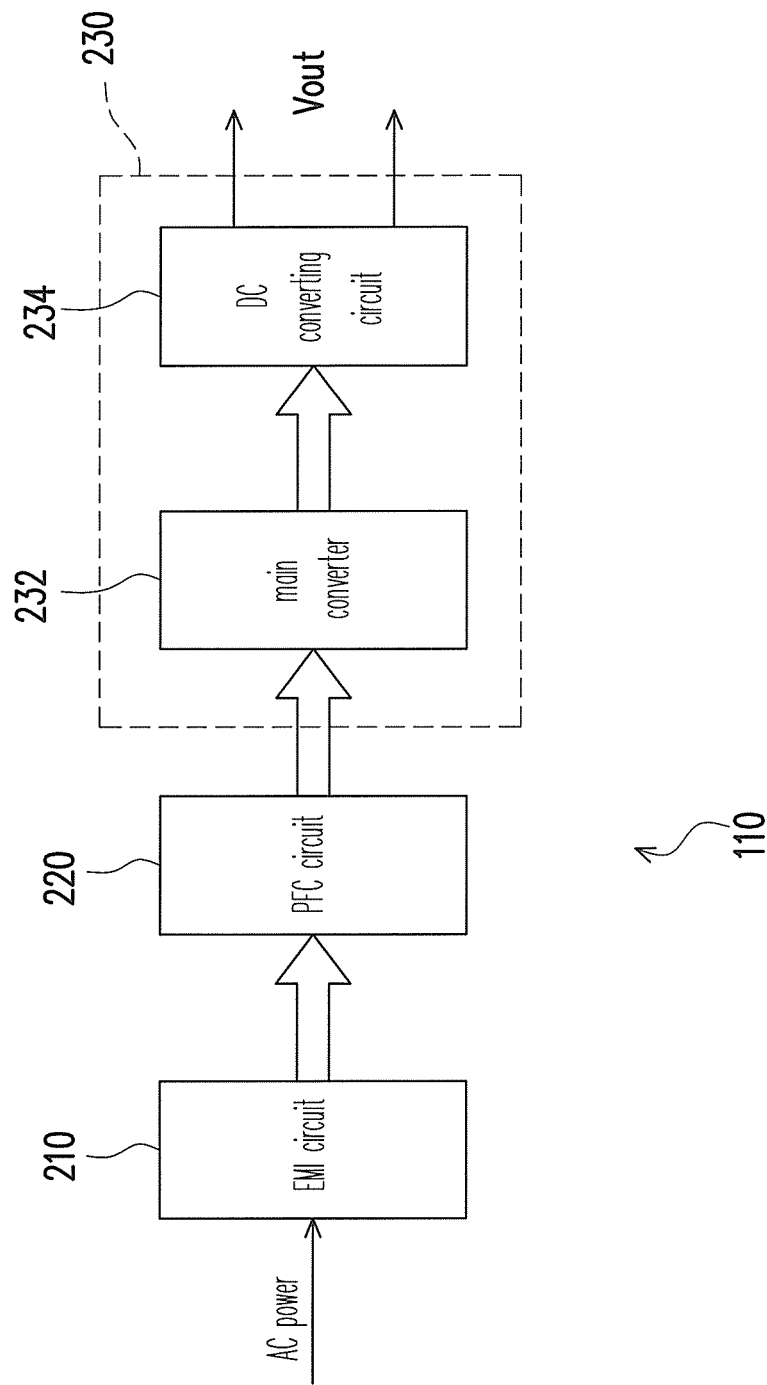
FIG. 2 is a schematic diagram showing a main circuit configuration of the power supply in an embodiment of the invention.

The main circuit structure of the voltage converter 110 is shown in FIG. 2. FIG. 2 is a schematic diagram showing a main circuit structure of the power supply according to an embodiment of the invention. The voltage converter 110 mainly includes an EMI filter 210, a PFC circuit 220 and a voltage converting circuit 230. The voltage converting circuit 230 further includes a main transformer 232 and a DC converter 234. The PFC circuit 220 is coupled between the EMI filter 210 and the voltage converting circuit 230. The main transformer 232 is coupled to the PFC circuit 220 and the DC converter 234.

Generally, the circuit structure of the voltage converter 110 is embodied in the primary winding and the secondary winding of the main transformer 232. The voltage converter 110 is divided into a primary winding circuit and a secondary winding circuit. The primary winding circuit is mainly used to receive the AC power, filter the high-frequency noise in the AC power via the EMI filter 210 and adjust the power factor of the AC power via the PEC circuit 220. The secondary winding circuit is mainly used to convert the AC voltage to the DC voltage, adjust the DC voltage and filter and smooth the wave. Generally, the operating voltage of the secondary winding circuit is less than the operating voltage of the primary winding circuit. The circuit structure of the voltage converter 110 also may include other circuit elements such as a capacitor, a power transistor and so on. FIG. 2 is only a schematic diagram showing an embodiment of the invention, and the voltage converter 110 is not limited thereto. The circuit architecture of the voltage converter 110 may be designed according to the architecture of the ATX power supply, and it is not illustrated again for a concise purpose.

In the embodiment, the voltage converter 110 may be an ATX power supply for converting the AC power to the DC power and output the DC power to the system terminal such as the motherboard of a computer via the ATX power connector. The state detecting unit 120 detects the state of the voltage converter 110 such as the input voltage, the input current, the power, the temperature change of the primary winding circuit and the output voltage, the output current, the power and the temperature and the fan speed of the secondary winding circuit. The state detecting unit 120 may convert the detected state information to a high-frequency signal and then output the high-frequency signal via the ATX power connector 130. The motherboard 115 may know the state of the voltage converter 110 via the decoder 150 to manage the power properly. The decoder 150 may be disposed on the motherboard 115 or replaced by the BIOS chip on the motherboard 115. The designer may integrate the function of the decoder 150 in the BIOS chip in the firmware mode.

Since the operating voltage range of the primary winding circuit and that of the secondary winding circuit of the voltage converter 110 are different, the state detecting unit 120 may utilize two microcontrollers to detect the voltage, the current, the power, the temperature and other state information of the primary winding circuit and those of the secondary winding circuit, respectively, according to the circuit structure of the voltage converter 110. The state detecting unit 120 also may utilize a single microcontroller to detect the information and convert the information to the signal, and the invention is not limited thereto. After obtaining the state data of the voltage converter 110, the state detecting unit 120 converts the data into a high-frequency signal, and then carries the high-frequency signal in the power state pin of the ATX power connector, which is the eighth pin, the "power good" pin of the ATX power connector.

Figure 3:
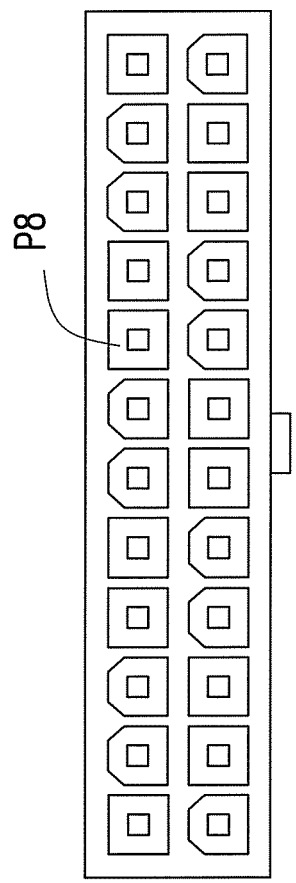
FIG. 3 is a schematic diagram showing the architecture of the ATX power connector in an embodiment of the invention.

In the embodiment, the ATX power connector has, for example, 24 pins. The structure of the ATX power connector is shown in FIG. 3. FIG. 3 is a schematic diagram showing the architecture of the ATX power connector in an embodiment of the invention. The eighth pin P8 is a "power good" pin, which mainly uses the DC voltage level to show whether the voltage outputted by the power supply is in a normal range. When the outputted voltage is normal, the "power good" pin may output the DC voltage at a logical high level (usually 5V). Since the high-frequency signal is a digital signal with high frequency, and the "power good" pin only can be at a logical high level or a logical low level, to the high-frequency signal, the original signal of the "power good" pin can be seen as a signal at a DC level. The high-frequency signal is directly carried in the DC voltage level of the "power good" pin to exist along with the DC voltage on the "power good" pin in the form of the carrier wave.

In addition, to prevent the amplitude of the high-frequency signal from affecting the original DC voltage level on the "power good" pin, the amplitude of the high-frequency signal is less than half of the maximum value (which is the logical high level) of the DC voltage level of the "power good" pin. The transmission way of the high-frequency signal is shown in FIG. 4. FIG. 4 is waveform chart showing a signal wave of the "power good" pin. As shown in FIG. 4, when the voltage outputted by the power supply is in the normal range, the DC voltage level 410 of the "power good" pin is at the logical high level, and the high-frequency signal 420 is carried in the DC voltage level 410 of the "power good" pin in the form of the carrier wave.

The motherboard may know the information meeting the ATX form factor according to the DC voltage level 410 of the "power good" pin, and it also may obtain the state of the voltage converter 110 by decoding the high-frequency signal 420 on the "power good" pin. Thus, the system may know the changes of the input voltage, the input current, the output voltage, the output current, the power, the temperature and the protecting signal of the power supply, and it also may show them on the screen instantly to allow the user to know the power used by the system, and evaluate whether the power supply satisfies the requirement or whether it is overheated or overloaded.

In addition, the high-frequency signal 420 is not limited to be the digital signal or analog signal. The user may use the proper communication protocol or signal form according to the system requirement, as long as the state detecting unit 120 and the decoder 150 may transmit signal to each other. The invention is not limited thereto.

In addition, since the high-frequency signal is carried in the power state pin of the original ATX power connector, the original ATX transmission form factor and function are not affected. Thus, even if the motherboard cannot decode the high-frequency signal, the power supply 105 still may be used normally. The decoder 150 in the computer system 100 may be selectively integrated in the general motherboard. When the decoder 150 is not integrated, the power supply 105 of the system also may be used as the general ATX power supply. When the decoder 150 is integrated, the main body system may know the state of the power supply 105 via the high-frequency signal outputted by the state detecting unit 120. In other words, the power supply 105 in the embodiment may be used in the general main unit system independently, and the decoder 150 may be integrated in the motherboard or not or selectively enabled according to the user's requirement.

To sum up, in the invention, the high-frequency signal is carried in the power state pin of the ATX power connector without affecting the ATX power connector architecture and transmission form factor. Thus, the motherboard may obtain the information of the power supply via the ATX power connector to monitor the power supply instantly.

Although the present invention has been described in the following detail description. The disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A computer system comprising:
 a power supply for supplying power to a motherboard, the power supply including:
  a state detecting unit for detecting a power state in the power supply and converting the power state to a high-frequency signal; and
  an advanced technology extended (ATX) power connector, wherein the power supply transmits the high-frequency signal via the ATX power connector,
  wherein the state detecting unit carries the high-frequency signal in a DC voltage level of a "power good" pin; and
 a motherboard, including:
  an ATX power plug connected to the ATX power connector of the power supply and receiving a voltage and the high-frequency signal outputted by the power supply; and
  a decoder for decoding the high-frequency signal and allowing the power state of the power supply to be displayed via a screen.

2. The computer system according to claim 1, wherein the ATX power connector has a "power good" pin for transmitting the high-frequency signal to the ATX power plug of the motherboard.

3. The computer system according to claim 2, wherein the power supply adjusts a direct current (DC) voltage level of the power good pin to show whether the voltage outputted by the power supply is in a normal power range.

4. The computer system according to claim 3, wherein the amplitude of the high-frequency signal is less than half of the maximum value of the DC voltage level.

5. The computer system according to claim 1, wherein the power supply further comprises a voltage converter for converting an alternating current (AC) power to a DC power.

6. The computer system according to claim 5, wherein the voltage converter further comprises:
 an electromagnetic interference (EMI) filter for filtering high-frequency noise of the AC power;
 a power factor correction (PFC) circuit coupled to the output of the EMI filter; and
 a voltage converting circuit, coupled to the output of the PFC circuit, for outputting the DC power;
 wherein the state detecting unit is coupled to the voltage converter and used for detecting voltages, currents, power, temperatures and fan speeds of the PFC circuit and the voltage converting circuit to generate the power state.

7. The computer system according to claim 1, wherein the voltage converting circuit further comprises a main transformer and a DC converter.

8. The computer system according to claim 4, wherein the state detecting unit comprises:

a first microcontroller for detecting the state of a primary winding of the voltage converter; and a second microcontroller for detecting the state of a secondary winding of the voltage converter.

9. The computer system according to claim 1, wherein the decoder is a basic input/output system (BIOS).

10. The computer system according to claim 1, wherein the power state comprises an input voltage, an input current, an output voltage, an output current, a temperature value and a protecting signal of the power supply.

\* \* \* \* \*